(12) United States Patent
Kamman

(10) Patent No.: US 8,701,402 B2
(45) Date of Patent: Apr. 22, 2014

(54) RESERVOIR-LESS POWER STEERING SYSTEM

(75) Inventor: Kenneth Kamman, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 893 days.

(21) Appl. No.: 12/880,063

(22) Filed: Sep. 11, 2010

(65) Prior Publication Data

US 2012/0061165 A1    Mar. 15, 2012

(51) Int. Cl.
*F16L 55/04* (2006.01)

(52) U.S. Cl.
USPC .................................. 60/453; 138/26; 138/30

(58) Field of Classification Search
USPC ........... 60/453; 180/417; 137/565.17, 565.19, 137/565.34, 565.37; 138/26, 30
See application file for complete search history.

(56) References Cited

U.S. PATENT DOCUMENTS

| | | | | |
|---|---|---|---|---|
| 2,100,404 | A * | 11/1937 | Mason et al. | 138/26 |
| 5,983,946 | A * | 11/1999 | Chen et al. | 138/30 |
| 7,712,454 | B2 * | 5/2010 | Wattai et al. | 123/509 |
| 7,721,765 | B2 * | 5/2010 | Dooley | 138/30 |
| 8,136,509 | B2 * | 3/2012 | Wattai et al. | 123/509 |
| 2006/0201734 | A1 * | 9/2006 | Hartle | 180/417 |

* cited by examiner

*Primary Examiner* — Thomas E Lazo
(74) *Attorney, Agent, or Firm* — Joseph E. Root

(57) ABSTRACT

A reservoir-less power steering system having a hydraulic pump, a storage tube, a steering gear assembly, and a return line. The storage tube accommodates and provides hydraulic fluid to the hydraulic pump. Further, the hydraulic pump increases the hydraulic fluid pressure and transfers the pressurized hydraulic fluid to the steering gear assembly. A return line is connected to the steering gear assembly and coupled to the storage tube for returning the hydraulic fluid from the steering gear assembly to the hydraulic pump. Moreover, the storage tube extends upwards from the hydraulic pump to include a hydraulic fluid level measurement assembly.

12 Claims, 3 Drawing Sheets

RESERVOIR-LESS POWER STEERING SYSTEM

BACKGROUND

This application relates generally to the field of automotive power steering systems, and more particularly to methods for maintaining the hydraulic fluid supply in such systems.

Conventional automotive hydraulic power steering systems include a fluid reservoir, a hydraulic pump, and a steering gear assembly. The fluid reservoir supplies a hydraulic fluid through a suction hose to the hydraulic pump, which increases the hydraulic fluid pressure and provides this pressurized hydraulic fluid to the steering gear assembly through a high-pressure line. Here, the pressurized fluid actuates the steering gear assembly, which in turn steers the vehicle wheels. The spent hydraulic fluid returns to the fluid reservoir through a secondary hose.

In the engine compartment of modern automobiles, space is at an extreme premium. Therefore, any design modifications that can reduce the amount of volume required for a particular system are highly useful. Power steering systems generally offer few opportunities for saving space, but designers have focused on the reservoir, in particular, as a target for design improvements.

Existing solutions offer a reservoir design approach involving mounting the fluid reservoir directly on the engine without any pump modifications. These solutions neither reduce complexity nor improve efficiency.

It is evident that there remains a need to develop a simple and compact hydraulic power steering system design for enhancing the efficiency and reducing the entire hydraulic power steering system cost.

SUMMARY

One embodiment describes a reservoir-less power steering system having a steering gear assembly that is driven by a pressurized hydraulic fluid. The system includes a storage tube in fluid communication with a hydraulic pump. The hydraulic pump increases the hydraulic fluid pressure and transfers the pressurized hydraulic fluid to the steering gear assembly. A return line is coupled to the storage tube for returning the hydraulic fluid from the steering gear assembly to the hydraulic pump. Further, the storage tube extends upwards from the hydraulic pump, and is being sized to accommodate sufficient hydraulic fluid to operate the hydraulic pump.

Certain embodiments describe a reservoir-less power steering system having a hydraulic pump, a steering gear assembly, a storage tube, and a return line. The steering gear assembly is driven by a pressurized hydraulic fluid. The storage tube is being sized to accommodate sufficient hydraulic fluid, and maintain fluid communication with the hydraulic pump. The hydraulic pump increases the hydraulic fluid pressure and transfers the pressurized hydraulic fluid to the steering gear assembly connected to the return line. The return line is coupled to the storage tube for returning the hydraulic fluid from the steering gear assembly to the hydraulic pump. In addition, the storage tube extends upwards from the hydraulic pump to include a hydraulic fluid level measurement assembly.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

Overview

The present disclosure describes a reservoir-less power steering system having a hydraulic pump and a steering gear assembly driven by a pressurized hydraulic fluid. The system replaces typical power steering components such as the reservoir and the suction hose, with a storage tube, which stores the hydraulic fluid, and delivers it to the hydraulic pump. Further, the storage tube may include an accessibly mounted hydraulic fluid level measurement assembly having a dipstick.

Embodiments of the present disclosure describe direct attachment of the storage tube to the hydraulic pump without any pump design modifications. Further, the storage tube may be attached to the engine resulting in total isolation from the passenger compartment offering NVH (noise, vibration, and harshness) advantage. Additionally, the storage tube facilitates evacuation, filling, and returning oil in the power steering system.

DESCRIPTION OF EMBODIMENTS

Figure 1:
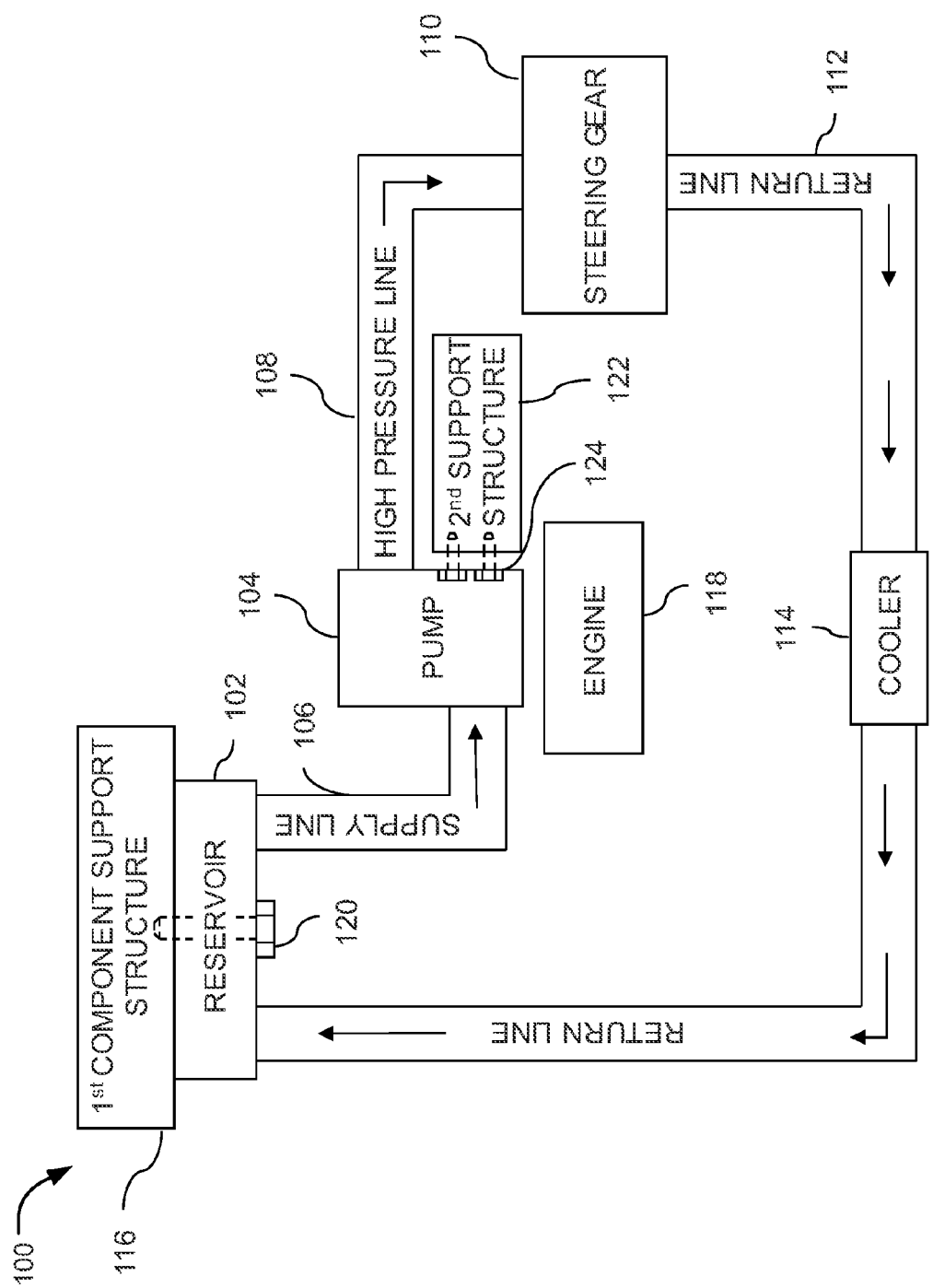
FIG. 1 is a schematic representation of a conventional power steering system.

FIG. 1 is a schematic representation of a conventional power steering system 100 having a reservoir 102 and a pump 104. A suction hose such as supply line 106 provides hydraulic fluid stored in the reservoir 102 to the pump 104. The pump 104 may be a variable displacement or a positive fixed hydraulic pump known in the art, which supplies the hydraulic fluid to a steering gear assembly 110 via a high-pressure line 108. A return line 112 transfers the hydraulic fluid from the steering gear assembly 110 to the reservoir 102. The system 100 may also employ a cooler 114 to reduce the hydraulic fluid temperature. Typically, the reservoir 102 is secured to a first component support structure 116 such as a vehicle body, a frame, or a portion of an automobile engine 118 using reservoir fasteners 120. The pump 104 may be secured to a second component support structure 122 using pump fasteners 124. In a conventional vehicle, the first component support structure 116 and the second component support structure 122 are typically located in the automobile engine 118 compartment in distinctly separate locations. Typically, the reservoir 102 and the supply line 106 occupy a large amount of space, making the system 100 bulky. Moreover, most hydraulic pumps generate high frequency vibrations, which travel up to the reservoir 102. As the reservoir 102 is typically connected to the vehicle body, these vibrations are transferred to the vehicle body, which may be heard in the passenger compartment causing discomfort. Embodiments of the present disclosure may alleviate one or more of the issues concerning typical power steering systems by utilizing the reservoir-less power steering system described in detail with reference to FIG. 2.

Figure 2:
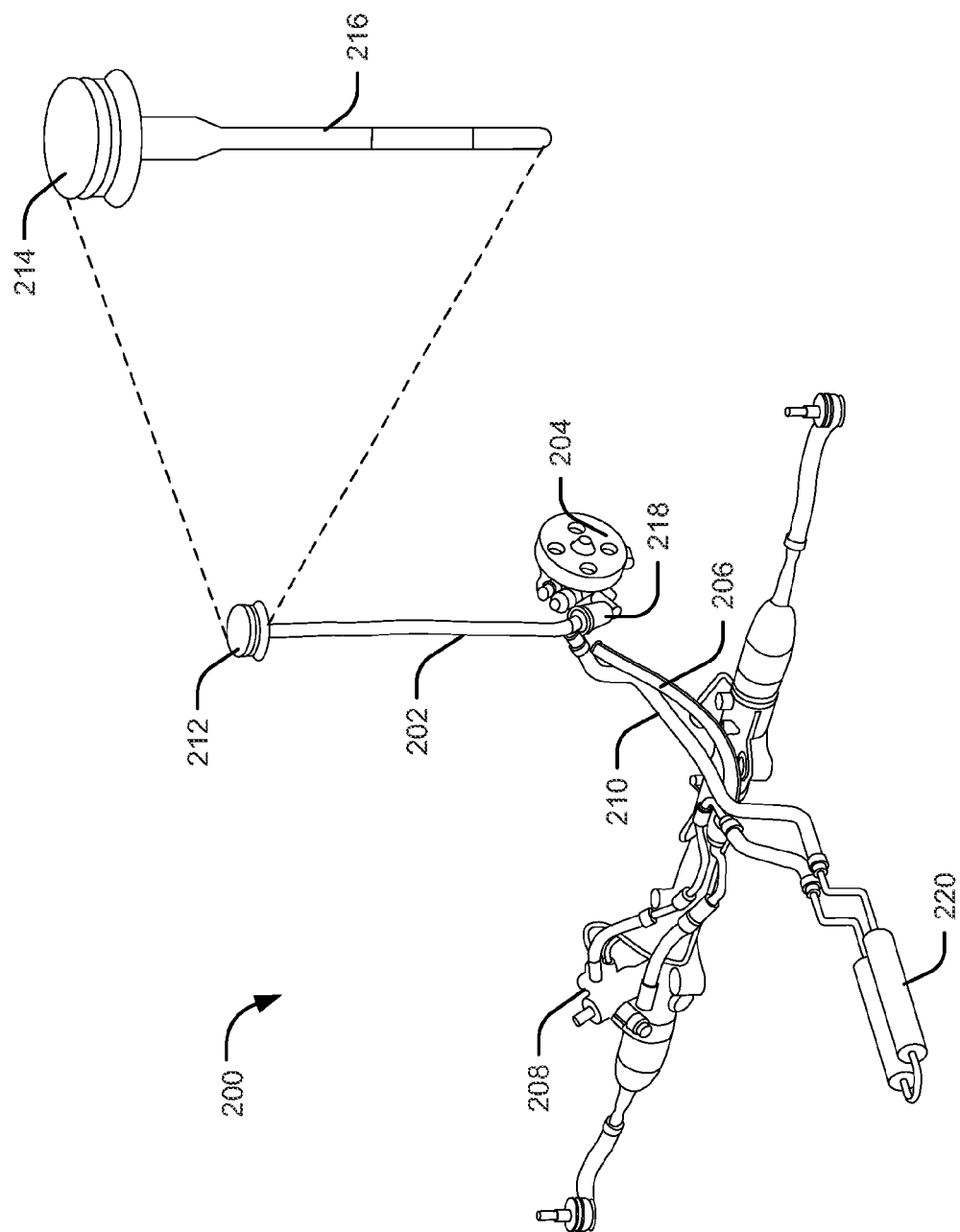
FIG. 2 is a pictorial view of an exemplary embodiment of a reservoir-less power steering system.

FIG. 2 illustrates an exemplary reservoir-less power steering system 200. The system 200 includes a storage tube 202, a hydraulic pump 204, a pressure line 206, a steering gear assembly 208, and a return line 210. Further, the system 200 may employ a hydraulic fluid level measurement assembly 212, a filter 218, and a pair of coolers 220.

As illustrated, the hydraulic pump 204 is driven by an automobile engine (not shown) via a belt and a pulley (not shown), providing hydraulic power for steering. The operation of the hydraulic pump 204 will not be explained in detail, as those skilled in the art will comprehend those functions.

The storage tube 202 may feed directly into the hydraulic pump 204. While the natural operation of the hydraulic pump 204 will produce suction on the hydraulic fluid within the storage tube 202, the hydraulic fluid will also operate by gravity flow, supplying the hydraulic fluid to the hydraulic pump 204 even before it begins operation. The storage tube 202 diameter depends on the volume of the hydraulic fluid required to operate the hydraulic pump 204. A factor in sizing the storage tube 202 is the requirement to accommodate temperature-driven expansion and contraction of the hydraulic fluid. The storage tube 202 can be attached to existing power steering pumps, allowing backward compatibility. In addition, being small, the storage tube 202 may be attached to the upper portion of the automobile engine, precluding propagation of pump vibrations to the vehicle body.

Figure 3:
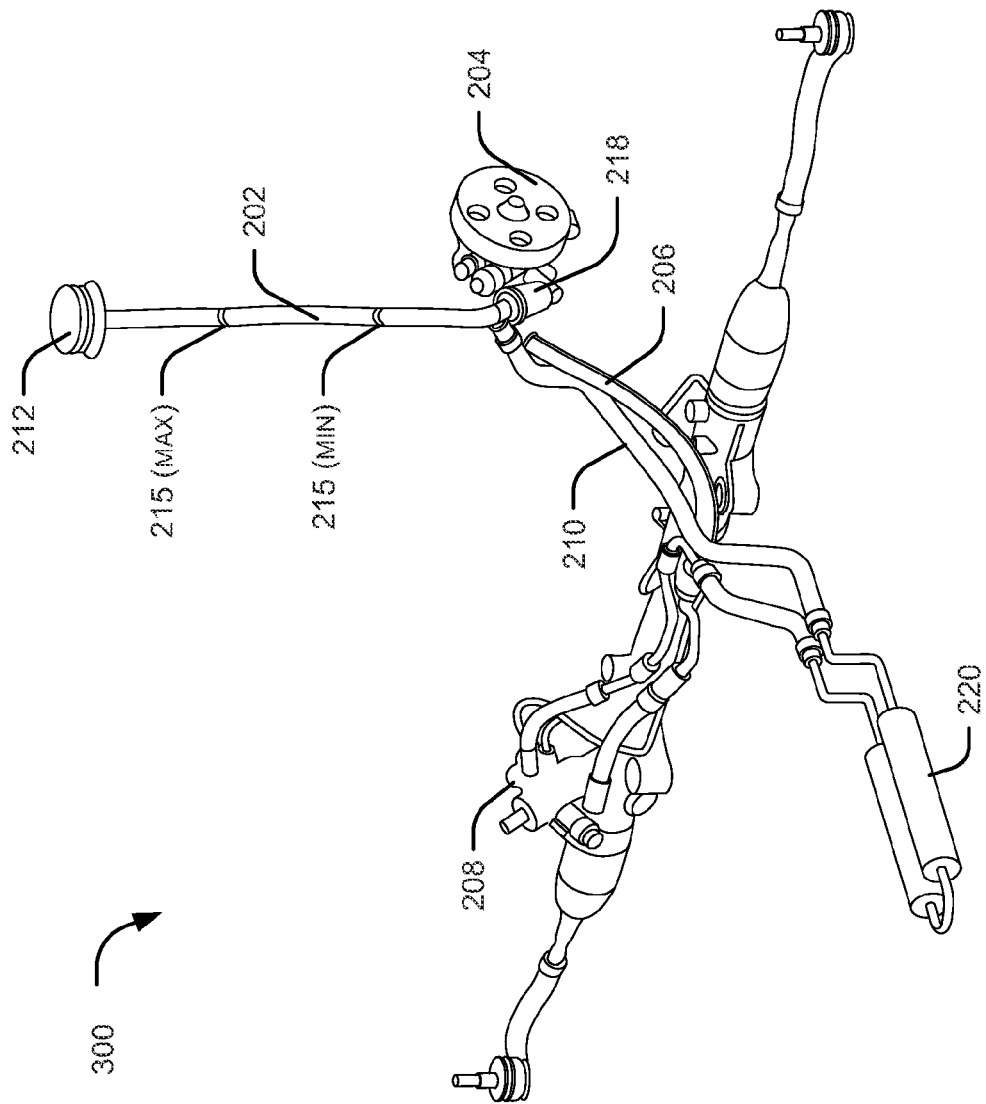
FIG. 3 is a pictorial view of an alternative implementation of the embodiment of FIG. 2.

The storage tube 202 further extends upwards from the hydraulic pump 204 to include an opening for adding or supplementing the hydraulic fluid. This opening may accommodate the hydraulic fluid level measurement assembly 212. In the illustrated embodiment, fluid level measurement is accomplished with the conventional dipstick, 216, where the fluid level measurement assembly 212 includes a screw cap 214 with an integrated dipstick 216. In another implementation, shown in FIG. 3, the storage tube 202, or at least the end portion of that tube, may be transparent or translucent and may include indicators 215 to show the maximum and minimum hydraulic fluid levels. This arrangement is easily produced by forming the end portion of the storage tube 202 from a clear or translucent plastic material, such as Nylon 66. Markings can be formed on the tube as known in the art.

An alternative storage tube could employ a control system (not shown) in the hydraulic fluid level measurement assembly 212 to detect the hydraulic fluid level and facilitate addition of the hydraulic fluid, if required. A sensing device (not shown) may be coupled to the system 200 to send the hydraulic fluid level information to the control system. Further, the control system may indicate the hydraulic fluid level based on which the hydraulic fluid may be added to the system 200.

The pressure line 206 may connect the hydraulic pump 204 to the steering gear assembly 208, and the return line 210 may connect the steering gear assembly 208 to the storage tube 202 for returning the spent hydraulic fluid. Alternatively, the return line 210 may cool the hydraulic fluid through one or more coolers 220 before returning the hydraulic fluid to the storage tube 202.

Hydraulic systems conventionally include a filter, such as the filter 218, for removing objects that may become entrained in the hydraulic fluid. In the illustrated embodiment, the filter 218 may be located in the pressure line 206, relatively close to the hydraulic pump 204. Alternatively, the filter 218 could be positioned in the return line 210. Here, the filter 218 may be selected from among those suitable filters known to those of skill in the art. Additionally, one or more coolers 220 could be provided to maintain the hydraulic fluid temperature.

In the illustrated embodiment, the system 200 stores the hydraulic fluid at atmospheric pressure in the storage tube 202. The hydraulic pump 204 may provide high-pressure hydraulic fluid through the pressure line 206 to drive the steering gear assembly 208. The return line 210 may re-circulate the hydraulic fluid to the storage tube 202.

It should be noted that the description above does not set out specific details of manufacture or design of the various components. It is envisioned that techniques, designs, and materials known in the art can be employed, and those in the art are capable of choosing suitable manufacturing and design details.

CONCLUSION

The present disclosure describes a compact reservoir-less power steering system that reduces the space and complexity of such systems. Moreover, the storage tube attached to the upper portion of the automobile engine eliminates noise caused by high frequency vibrations.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

I claim:

1. A reservoir-less power steering system, having a steering gear assembly driven by a pressurized hydraulic fluid, the system comprising:
   a hydraulic pump;
   a storage tube in fluid communication with the hydraulic pump, the hydraulic pump transferring the pressurized hydraulic fluid to the steering gear assembly, the storage tube including a hydraulic fluid level measurement assembly; and
   a return line coupled to the storage tube for returning the hydraulic fluid from the steering gear assembly to the hydraulic pump,
   wherein the storage tube extends upwards from the hydraulic pump, the storage tube being sized to accommodate sufficient hydraulic fluid to operate the hydraulic pump.

2. The system of claim 1, wherein the hydraulic fluid level measurement assembly includes an accessibly mounted dipstick for measuring the hydraulic fluid level.

3. The system of claim 1, wherein the hydraulic fluid level measurement assembly comprises a portion of the storage tube through which the fluid level is visible to an operator.

4. The system of claim 1, wherein the hydraulic fluid in the storage tube is at atmospheric pressure.

5. The system of claim 1, wherein the return line includes a filter.

6. The system of claim 1, wherein a filter is positioned between the storage tube and the hydraulic pump.

7. A reservoir-less power steering system, comprising:
   a hydraulic pump;
   a steering gear assembly, driven by a pressurized hydraulic fluid;

a storage tube in fluid communication with the hydraulic pump, the hydraulic pump transferring the pressurized hydraulic fluid to the steering gear assembly, and the storage tube being sized to accommodate sufficient hydraulic fluid; and a return line coupled to the storage tube for returning the hydraulic fluid from the steering gear assembly to the hydraulic pump, wherein the storage tube extends upwards from the hydraulic pump to include a hydraulic fluid level measurement assembly.

8. The system of claim 7, wherein the hydraulic fluid level measurement assembly includes an accessibly mounted dipstick for measuring the hydraulic fluid level.

9. The system of claim 7, wherein the hydraulic fluid level measurement assembly comprises a portion of the storage tube through which the fluid level is visible to an operator.

10. The system of claim 7, wherein the hydraulic fluid in the storage tube is at atmospheric pressure.

11. The system of claim 7, wherein the return line includes a filter.

12. The system of claim 7, wherein a filter is positioned between the storage tube and the hydraulic pump.

* * * * *